United States Patent [19]

Bennett

[11] 4,010,553
[45] Mar. 8, 1977

[54] PORTABLE QUIZ RESPONSIVE AND DISPLAY DEVICE

[76] Inventor: Robert A. Bennett, 312 Ronbru Drive, New Rochelle, N.Y. 10804

[22] Filed: Sept. 19, 1975

[21] Appl. No.: 614,922

[52] U.S. Cl. ............................................. 35/9 C
[51] Int. Cl.² ............................................. G09B 7/06
[58] Field of Search ................... 35/9 C, 9 B, 60

[56] References Cited
UNITED STATES PATENTS

| | | | |
|---|---|---|---|
| 2,104,718 | 1/1938 | Dougherty | 35/9 C |
| 2,867,045 | 1/1959 | Millgate | 35/60 |
| 3,106,784 | 10/1963 | Raley | 35/9 C |
| 3,206,871 | 9/1965 | Schure et al. | 35/9 C |
| 3,316,660 | 5/1967 | Greenspan | 35/9 C |
| 3,824,706 | 7/1974 | Scopa et al. | 35/9 C |
| 3,879,860 | 4/1975 | Litle | 35/9 C |

Primary Examiner—Anton O. Oechsle
Attorney, Agent, or Firm—Dayton R. Stemple, Jr.

[57] ABSTRACT

A portable case that carries multi-subject quiz cards to which selected answers by a user are automatically noted as correct or incorrect which provides compact storage for a complete display unit when being transported and full display area when opened for all the necessary components of multiquiz cards, related pamphlets or posters and the electrical mechanism to indicate proper or improper answers. The cards have apertures adjacent the answers through which an electrical circuit probe may be placed to reach a panel in registry with the card, the panel having openings associated with correct answers so a light circuit may be closed but incorrect answers areas being covered with an electrical insulating medium to prevent closing the lighting circuit.

2 Claims, 10 Drawing Figures

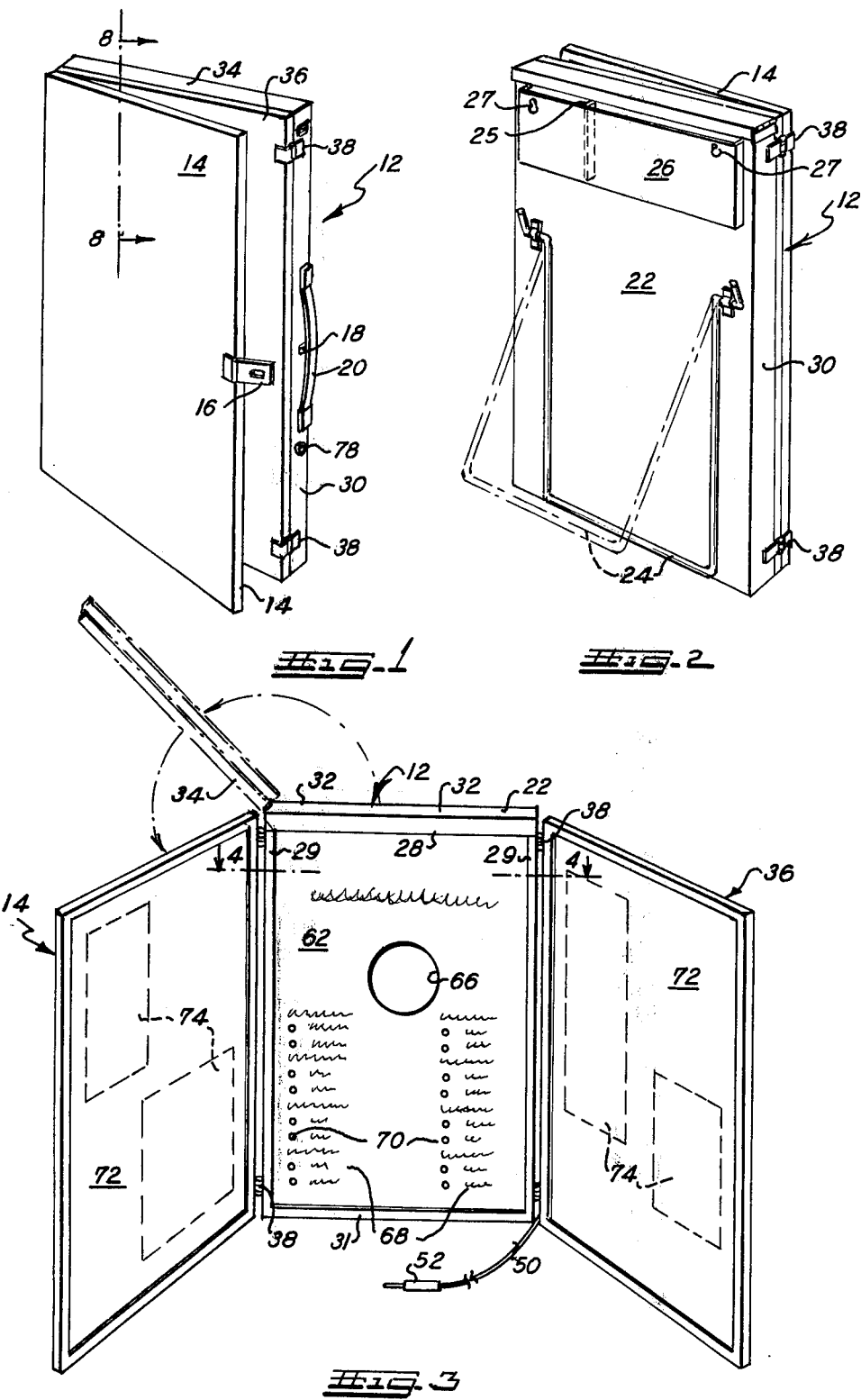

PORTABLE QUIZ RESPONSIVE AND DISPLAY DEVICE

BACKGROUND

1. Field of the Invention

This invention relates to new and useful improvements in a portable teaching display unit and more particularly seeks to provide a convenient case that can be readily converted from a carrying case for all the components to a display unit that is an attractive, desirable teaching mechanism for individual users and specially embodies in such a unit a laminated structure providing predetermined areas of conductance and insulation whereby a circuit can be closed at conductance areas to light a bulb, ring a bell, etc. to indicate correct answers to a problem, but where the remaining areas of insulation will not close a circuit to provide such a signal.

2. Description of Prior Art

Many games or teaching units have involved a question-answer probe that closes an electrical circuit with a light therein on selection of a correct answer. Most of these have printed circuit systems or other complex and expensive electrical systems, as noted for example in U.S. Pat. Nos. 2,586,710, 2,889,634, 3,057,082 and 3,139,688. The Greenspan Pat. No. 3,316,660 has an aluminum foil laminated between two paper sheets, the paper sheets being perforated for an electrical probe to close a circuit through the metal foil conducting medium. To avoid closing the circuit at incorrect answers, the foil at those points is covered by a dielectric coating. The foil is associated with and laminated between two specified sheets and is not useable for other sheets.

SUMMARY OF THE INVENTION

In contrast to the prior art, this invention provides a solid metal panel with battery-light bulb unit mounted on one side with a long flexible lead and answer probe attached that permits closing of the circuit by contact of the metal panel with the probe. The opposite side of the metal panel is covered with a thin non-conductive layer, for example plastic, that is die cut to give a pattern of perforations whereby the probe can close the circuit through the opposite side only by contacting the metal through a perforation.

Multiple question sheets are prepared to overlay the die-cut plastic so that openings for correct answers only will be in alignment with die-cut openings. The die-cut openings pattern is such that a wide variety of question-answer cards with different correct answer patterns may be applied to the metal panel so that students or users can not memorize one pattern and apply that to subsequent test cards. Thus an entirely new information card may replace a former card without making any changes in the underlying metal circuit-closing panel.

The metal panel is mounted within a carrying and display case that provides storage space for a plurality of different question cards, one of which is placed in front of the lighting panel and the others behind but any of which may be easily and quickly exchanged with the front card. The carrying case is provided with pivotal side or wing panels for supplementary displays and a pocket for added displays, or literature the whole of which is foldable into a compact storage and carrying case.

OBJECTS OF THE INVENTION

It is an object of this invention to provide a circuit closing question answer panel that can be used with a plurality of different patterns that can be interchanged simply and quickly.

It is another object of this invention to provide a nonconductive layer, having a pattern of die cut openings, laminated to one side of a metal plate with a battery circuit, having a long lead mounted on the opposite side that can be closed by maneuvering the lead and touching the plate through the die cut openings.

It is a further object of this invention to provide an electrical answer panel, a plurality of different interchangeable question cards, and associated display space and documents that can all be stored and carried in a convenient carrying case which forms an easel stand for display and storage of the material.

With these and other objects, the nature of which are apparent, the invention will be more fully understood by reference to the drawings, the accompanying detailed description, and the appended claims.

BRIEF DESCRIPTION OF THE DRAWINGS

FIG. 1 is a front perspective view of a portable display case, with one wing panel slightly open, constructed in accordance with my invention.

FIG. 2 is a rear perspective view thereof.

FIG. 3 is a front perspective view thereof with both wing panels open in display position.

DESCRIPTION OF THE PREFERRED EXBODIMENTS

Figure 4:
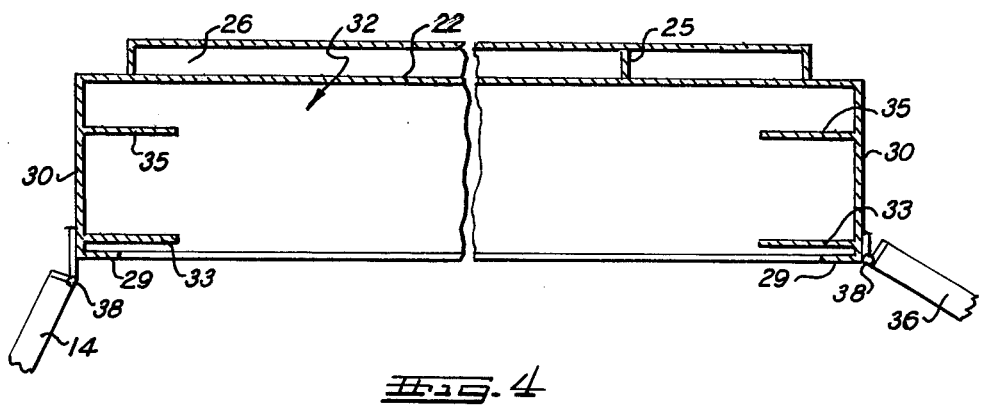
FIG. 4 is a horizontal cross section taken along line 4—4 of FIG. 3, and with all removable elements removed.
Figure 5:
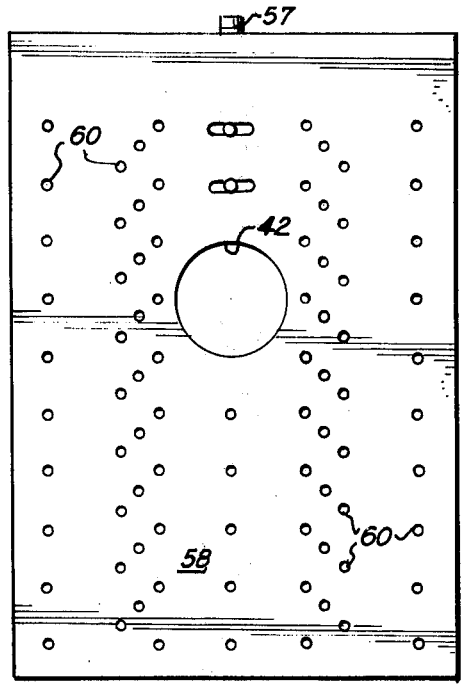
FIG. 5 is a front plan view of the selectively conducting panel.
Figure 6:
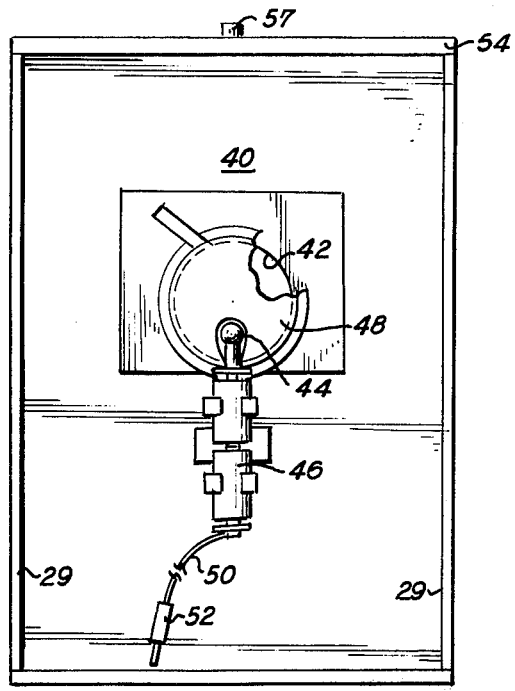
FIG. 6 is a rear plan view thereof.
Figure 7:
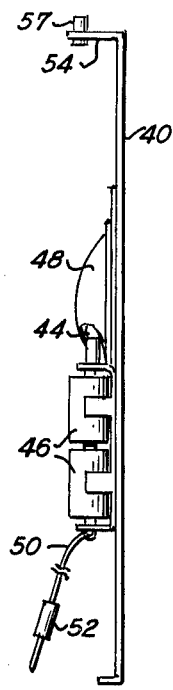
FIG. 7 is a side view thereof.

Referring to the drawings in detail, the invention as illustrated is embodied with a light signal in the circuit but which could be a bell, buzzer or other similar device.

The portable carrying case 12 as shown in FIG. 1, from the front has its outer wing panel 14 slightly open which can be closed and locked with strap 16 and catch 18 and then easily carried like an attache case with carrying handle 20. The rear fixed panel 22 has a pivotal wire stand 24 to support the unit like an easel in standing position as shown in FIG. 2, if necessary, although the wing panels generally hold the unit upright without the wire stand as shown in FIG. 3. Attached to the upper portion of the rear fixed panel is a rear compartment 26, divided into pockets by divider 25. The compartment is keyhold punched at 27, 27 for wall hanging if desired.

Figure 8:
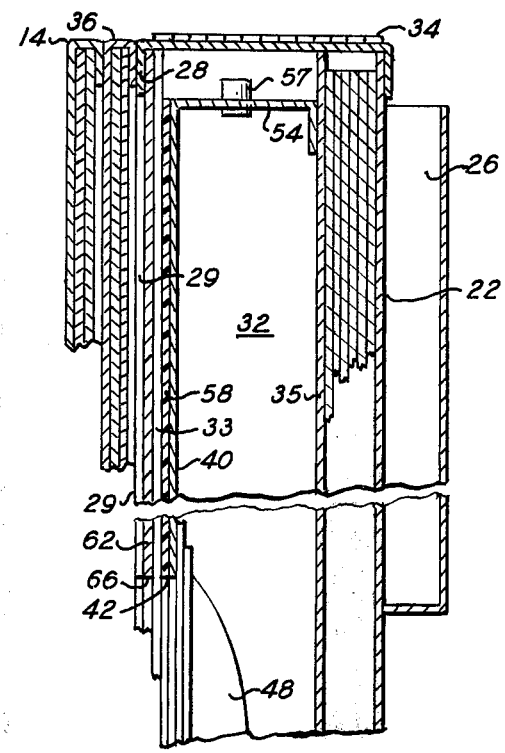
FIG. 8 is a cross section along line 8—8 of FIG. 1 with both wing panels closed.
Figure 10:
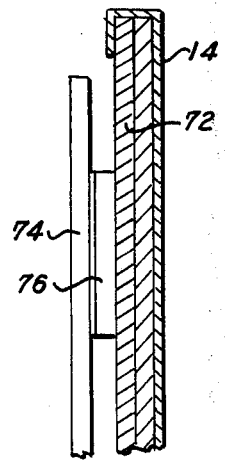
FIG. 10 is a detailed cross section of a wing panel with an exhibit attached thereto.

The rear panel 22, light panel 40, side panels 30, 30 and pivotal cap 34 form a chamber 32, (FIGS. 4 and 8). The front of the cabinet is defined by short inwardly extending side flanges 29,29, bottom flange 31, and top brace 28. Larger front flanges 33,33 are spaced far enough behind the short flanges 29 to permit a slidable cardboard panel 62 therebetween. Rear larger flanges 35,35 are spaced behind front flanges 33 far enough to permit the sliding of panel 40 therebetween with protective space for reflector 48. The rear flanges 35 are in turn spaced sufficiently far from rear panel 22 to permit sliding storage of six or eight cardboard panels therebetween. As shown in FIG. 3 particularly, the side display wing panels 14 and 36 are hinged to the side panels at opposite sides of the chamber by hinges 38 so that one can fold inside the other in closing position.

The slidable light panel 40 has an aperture 42 in the upper half and a lamp 44 with batteries 46, reflector 48 and a long lead 50 mounted so that the light from the lamp 44 is reflected through the aperture 42. The lead 50 has a metal probe 52 which completes the battery — bulb circuit when the probe contacts panel 40. The panel 40 has a rearwardly extending top flange 54 and bottom flange 56 which serve to maintain the panel forward in chamber 32 and protect the bulb-battery unit from being pressed against the rear panel 22. A button 57 is attached to the top flange 54 to aid in placing or removing the panel from the unit. The panel 40 can be 0.02 inch tin plate, aluminum or other conductive metal, preferably one that will not rust. Panel 40 and reflector 48 are shown as two elements but they may be formed by stamping as an integral unit from a single metal sheet with a plastic logo inserted over the front opening if desired. To the front surface of panel 40 is bonded a cut out non-conductive plastic film 58 such as 0.002 inch pressure sensitive acetate.

Figure 9:
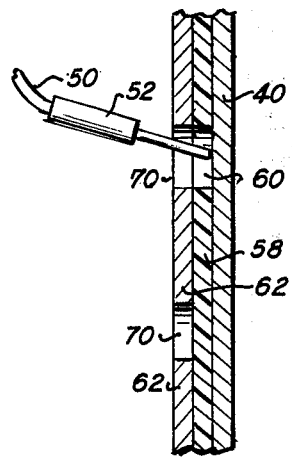
FIG. 9 is a detailed broken section through the selectively conducting panel and an overlaid quiz card.

The die cut openings 60 in film 58 leave exposed areas where probe 52 may close the lamp circuit. One cardboard quiz sheet 62 fits in front of panel 40-film 58 between flanges 29 and 33 and a plurality can be stored between flanges 35,35 and rear panel 22. The quiz sheet 62 has an aperture 66 in alignment with aperture 42 in the metal panel and printed information 68 thereon including questions with true-false or other multiple choice answers. As shown in FIG. 3, there are two possible openings 70 below each question. The probe 52 with long lead 50 is placed into one of the openings and if correct, the opening is in alignment with the die-cut 60 opening whereupon the circuit is closed and the bulb lit. The lower opening 70 on FIG. 9 shows a blockage, i.e. no die-cut in the acetate whereby the circuit cannot be closed. The die-cut pattern 60 is such that innumeral quiz pattern cards can be designed with each having a different answer pattern to avoid memorization of one answer card being carried over to others by the users. The side panels 14,36 are lined with Velcro felt 72 upon which may be mounted supplemental material 74 such as pamphlets, charts, photographs, etc., with pressure sensitive Velcro tape 76. Small magnets can also be used for the same purpose. Other supplemental materials and particularly booklets and pamphlets to be distributed may be kept in compartment 26.

For storage and transportation, the light panel 40 remains slidably enclosed between flanges 33 and 35. If the material mounted on wing panels 14 and 36 is thick, it may be placed along with the pamphlets from compartment 26 in the extra space provided by the reflector 48 behind the light panel 40 but it is preferred to have thin items that remain in place on the wing panels. With the wing panels closed and locked and the pivotal cap 34 closed and locked, the entire unit can be carried with handle 20 like an attache case with one main card 62 in working position in front of light panel 40 and a plurality of cards 62 behind the light panel.

Once at the desired location. the wings 14,36 are spread, the cap 34 may be opened (will pivot 270°) or remain closed, and the appropriate material placed on the wing panels and in compartment 26. The proper display card 62 on the main panel is selected and placed in front of the lighting panel 40. The probe 52 and elongated lead 50 which are stored behind the lighting panel 40 pass through an eyelet 78 located unobtrusively near the handle 20 and then through the space between wing panel 36 and side wall 30 to be available to the user for selecting answers to the questions posed on card 62.

One of the primary cards developed for example is entitled "Four Steps to Weight Control." Legends on the upper third of the card state "1. See Your Doctor," "2. Set Your Weight Goal," "3. Retrain Your Eating Habits," "4. Be More Active." Then on the lower two-thirds of the card are ten statements such as "Calories don't Count," "Middle-age spread is inevitable," etc., with two die cut openings 70 below each statement, marked "true" and "false," respectively. Each correct opening 70 is an alignment with an opening 60 in the plastic layer 58 and the incorrect opening 70 is in alignment with the plastic layer so that when the probe is placed in the correct opening the circuit will be closed and the bulb lighted whereas nothing happens when the probe is placed in the incorrect opening.

Attached to the wing panels in this particular display was an unique pamphlet "Four Steps to Weight Control" which has the same questions followed by a series of squares or dots, the correct answer being indicated by a lighter square or dot when held between a strong light source and the reader's line of vision. These same pamphlets were placed in compartment 26 and given to interested observers. In addition an exercise chart, an exercise guide pamphlet and sheet music for a song about weight were on the wing panels. This display was prepared by a major insurance company and other quiz cards maintained in the cabinet in the series were "Child Safety," "Your Health," "Health and Driving," "Stress" and "Emergencies," each of which had a different answering pattern and its separate associated material for display on the wings and in the compartment.

I claim:
1. An electrically operated self-examination device comprising
   A. an electrical circuit including a metal electrical conducting panel, a battery mounted on one side of said panel and electrically connected thereto, an electrical responsive lamp connected to one pole of said battery, and a probing lead connected to the other pole of said battery whereby contact of said probing lead with said panel closes the circuit and activates said lamp.
   B. a non-conducting plastic sheet laminated to the other side of said panel and having a plurality of apertures through which said circuit may be closed by contacting said probing lead to said panel.
   C. a question card adapted to be in flat registry against said non-conducting sheet, said card having printed questions on the surface opposed to said sheet, each question having multiple choice answers and an opening associated with each answer, said answer card openings having been positioned so that correct answer openings register with plas- tic sheet apertures whereby said lamp will be lit when said probe is placed through a correct answer aperture, and D. a case sized to hold in snug registry said conducting panel and said card lying against said non-conducting sheet with said card facing a front opening side of said case, said conducting panel being spaced from the rear wall of said case a sufficient distance to clear said battery and indicator and further provide space for storage of a plurality of said answer cards, said case being provided with a pivotal wing panel on each side of said front opening that overlap on closing to form a front wall to said case and provide two display panels when open, said card and said conducting panel having an opening in alignment with said lamp for observation thereof from the front of said case, and said rear wall having a pivotal support member to hold said case in standing position.

2. The device of claim 1 additionally comprising a carrying handle on a side wall and a display pocket on the upper rear wall, the opening of said pocket extending upwardly.

* * * * *